US006666496B2

(12) United States Patent
Rettig

(10) Patent No.: US 6,666,496 B2
(45) Date of Patent: Dec. 23, 2003

(54) DEVICE FOR FIXING AN INSERT IN AN OPENING OF A CARRIER IN VEHICLES, ESPECIALLY A DOOR HANDLE IN THE OPENING OF THE OUTER PANEL PERTAINING TO A DOOR

(75) Inventor: Reinhard Rettig, Gevelsberg (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 10/181,105

(22) PCT Filed: Dec. 13, 2000

(86) PCT No.: PCT/EP00/12627

§ 371 (c)(1),
(2), (4) Date: Sep. 16, 2002

(87) PCT Pub. No.: WO01/51746

PCT Pub. Date: Jul. 19, 2001

(65) Prior Publication Data

US 2003/0122398 A1 Jul. 3, 2003

(30) Foreign Application Priority Data

Jan. 12, 2000 (DE) ........................................ 100 00 863

(51) Int. Cl.[7] .................................................. B60J 1/08
(52) U.S. Cl. .................. 296/146.1; 292/347; 292/336.3
(58) Field of Search ..................... 296/146.1; 53/284.3; 206/560, 724; 224/322; 292/357, 359, 336.3, 347, 352; 70/208

(56) References Cited

U.S. PATENT DOCUMENTS 4,898,415 A 2/1990 Satoh

FOREIGN PATENT DOCUMENTS

DE 199 28 956 A1 12/2000
GB 1508858 4/1978

*Primary Examiner*—Kiran Patel
(74) *Attorney, Agent, or Firm*—Friedrich Kueffner

(57) ABSTRACT

The invention relates to a device for fixing an insert (10) in an opening of a carrier. The opening is defined by a and second carrier edge (21, 22). First and second edge areas (11, 12) appurtenant thereto and pertaining to the insert (10) are pressed against the opening in the case of fixing. According to the invention, the two edge areas of the insert (10) can be fixed essentially free from backlash and by means of a clamping device that consists of two clamping strips (60) which, preferably in a connected configuration, embrace the shell-shaped housing (13) in a waist-like manner.

14 Claims, 4 Drawing Sheets

FIG. 1
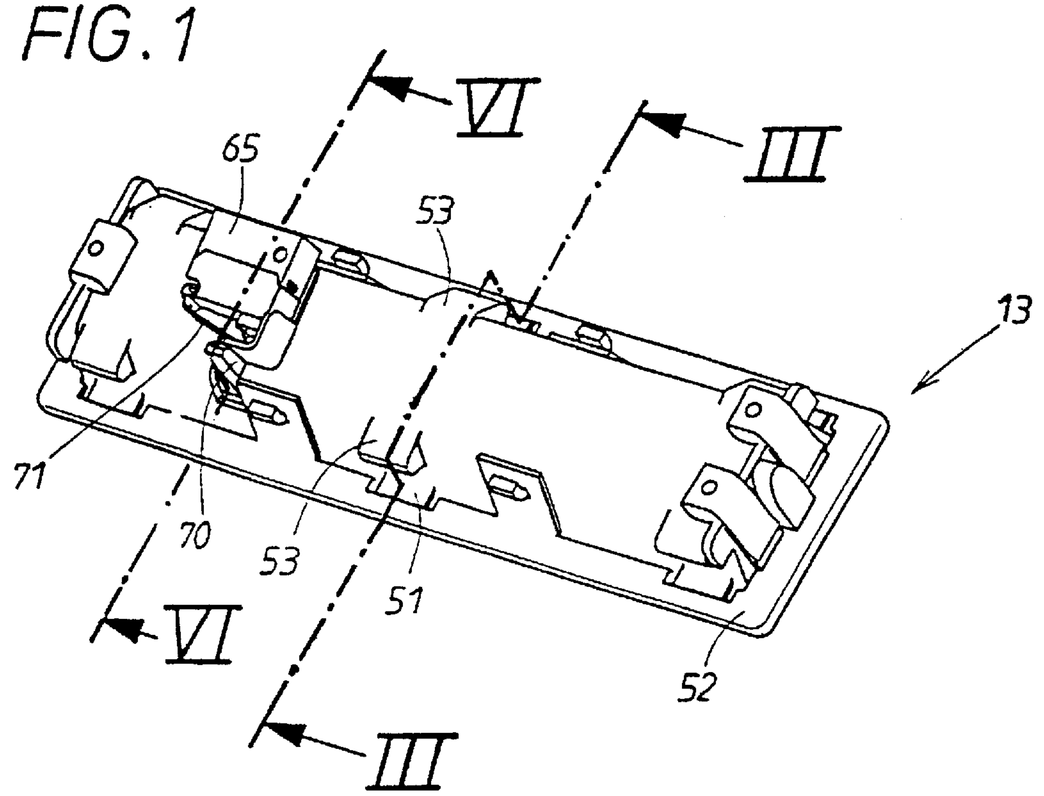
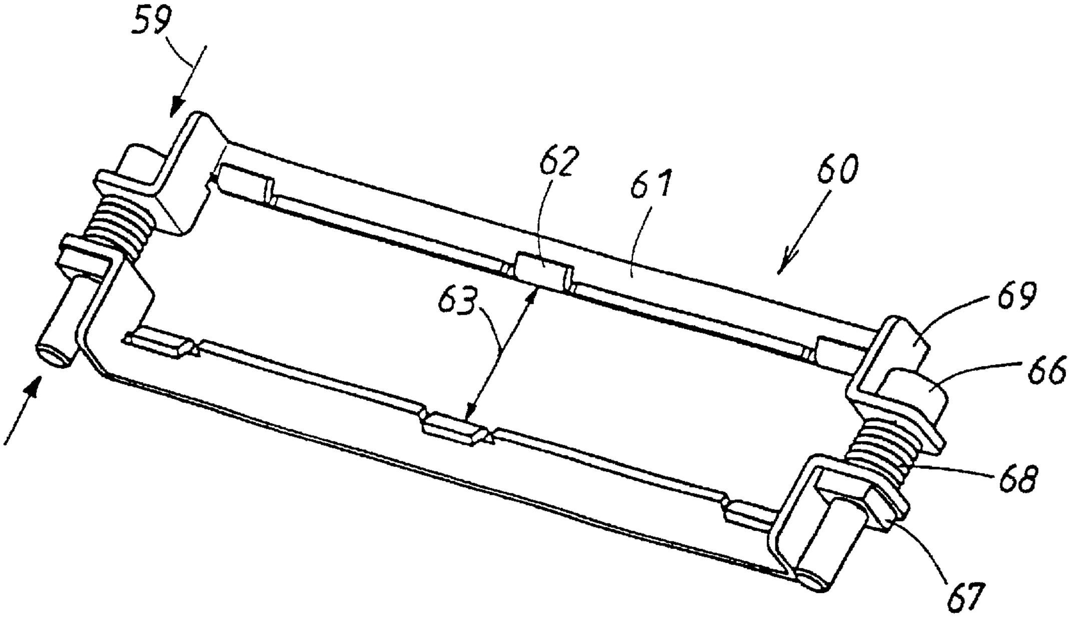
FIG. 2

DEVICE FOR FIXING AN INSERT IN AN OPENING OF A CARRIER IN VEHICLES, ESPECIALLY A DOOR HANDLE IN THE OPENING OF THE OUTER PANEL PERTAINING TO A DOOR

The invention pertains to a device of the type indicated in the introductory clause of claim 1. With this device, motor vehicle components with flat surfaces are to be fastened quickly and easily in openings in flat carrier components in such a way that, after the introduction of the insert, the fastening is not visible from the outside of the carrier and also so that the insert is fastened to the carrier with the least possible amount of play.

In the known device of this type (DE 195 33 655 C2), two different fastening means are required to fasten the insert in the carrier opening, one to press the first edge area of the insert against the first edge of the carrier and the other to press the second edge area against the second edge of the carrier in the fastened state. In addition to the pivoting lever, which presses the second, strip-like edge area of the insert against the second edge of the carrier, it was necessary to provide an additional pressing means in the opposite edge area of the insert. This additional pressing means had the job of fastening the carrier edge forming the boundary of the opening there to the insert. This pressing means consisted of elastic plates, which had to be produced separately and installed on a projection of the housing, the projection comprising a pivoting lever mechanism. In this known device, a dead-center spring is guided along a radial cam of a control piece seated on the shoulder and thus carries along with it the slotted arm of the pivotably supported lever. Upon completion of the fastening operation, the dead-center spring grips behind a projection of the radial cam and exerts a compressive force on the edge of the carrier present there. Removal of the insert from the carrier requires that the elastic plates in the area of the first carrier edge be removed first and that the dead-center spring then be lifted off the projection of the control piece in the second insert edge area. This is tedious and cumbersome.

A handle fastening in a motor vehicle door is also known from British Patent GB 1,508,858. Here the handle can be installed and removed quickly and easily. For this purpose, the handle, which is part of an insert, is inserted through the opening in the exterior door panel, after which shoulders on the rear of the insert are guided in succession through the opening. On the rear side of the opening, the two arms of a U-shaped clamp are slid in a direction parallel to the opening so that each arm arrives behind one of the previously mentioned shoulders, the insert part thus being held in position on the exterior door panel. This position is then made permanent by means of bolts. The disadvantage of this state of the art is that rattling noises can occur if the two shoulders are different distances away from the door panel or if the two clamping arms are of slightly different shape.

The invention is based on the task of developing a reliable device of the type indicated in the introductory clause of claim 1 which facilitates the fastening of the insert in, and, if necessary, the removal of the insert from, the opening in the carrier. This is accomplished according to the invention by the measures indicated in the characterizing clause of claim 1, to which the following special meaning belongs:

The invention makes use of a tensioning device to fasten the two edge area of the insert to the two edges forming the boundaries of the opening in the carrier in a manner which is essentially free of play. The tensioning device consists of two clamping strips, preferably connected to each other, which surround the waist of the shell-like housing. As the clamping strips approach each other, they are pressed into recesses provided in both sides of the housing and thus held in place. The final fastened state is made permanent by means of, for example, the fastening means which connect the clamping strips together. As a result of this fixation, pressure is applied between the two edge areas of the insert and the edges of the carrier forming the boundaries of the carrier opening, and this pressure can be maintained for as long as desired.

It is just as easy to remove the insert from the opening in the carrier as it is to install it.

To fasten the insert there is no need for separate fastening means between the two edge areas of the insert and the corresponding edges of the carrier.

Additional measures and advantages of the invention can be derived from the subclaims, from the following description, and from the drawings. The invention is illustrated on the basis of an exemplary embodiment in FIGS. 1–6 of the drawings:

FIG. 1 shows a perspective view of the shell-like housing;

FIG. 2 shows a perspective view of the clamping strips;

Figure 7:
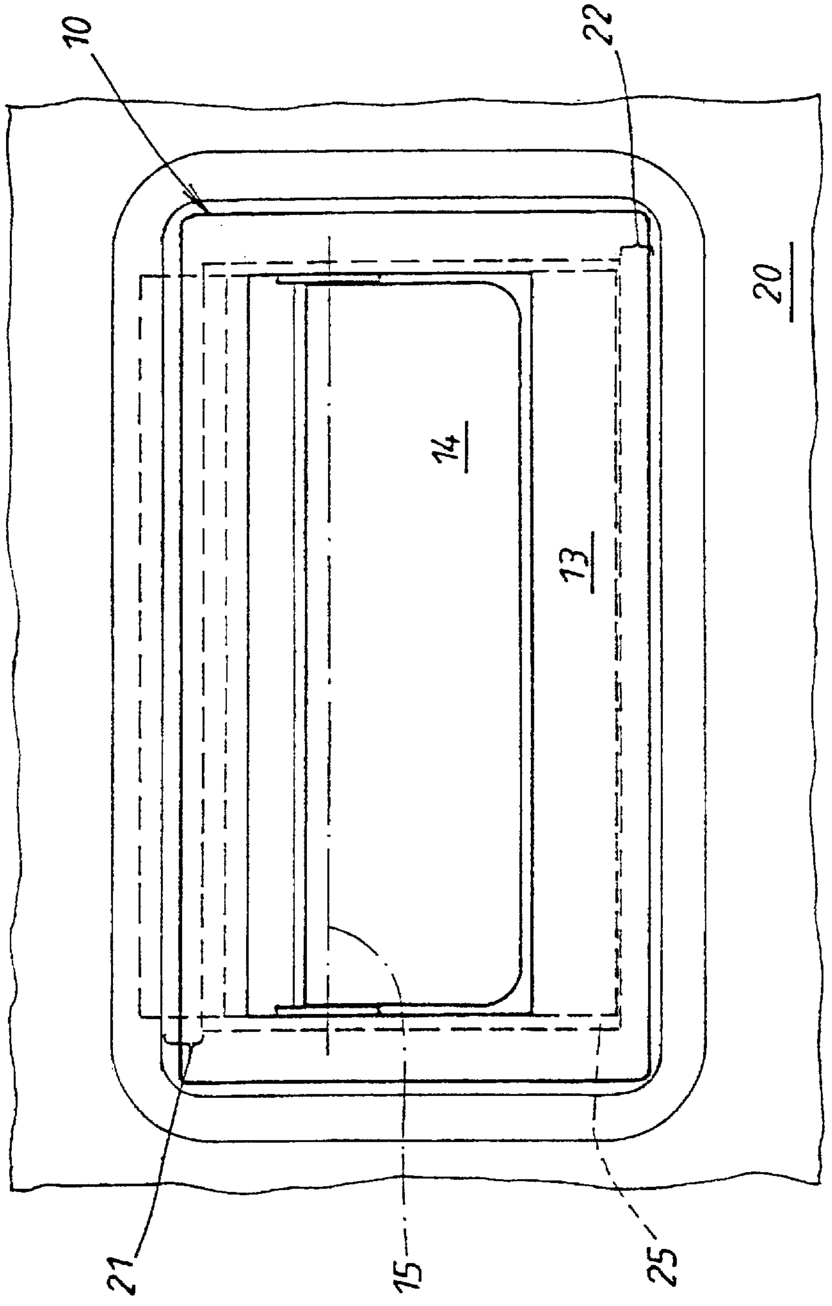
FIG. 7 shows a front view of a device according to the invention after the an insert, designed as a door handle, has been fastened in an opening of an exterior door panel.

Although FIG. 7 shows a door handle as the insert 10 to be fastened, which is attached in a cut-out opening 25, any desired type of insert 10 other than a door handle can be installed in the opening 25 of any type of carrier 20 in the manner according to the invention. The design and function of the device according to the invention described below can be transferred as appropriate to alternative applications. To illustrate this, the door handle and the exterior door panel 20 in this exemplary embodiment are also called the "insert" and the "carrier" in the following functional description of the fastening operation.

Figure 3:
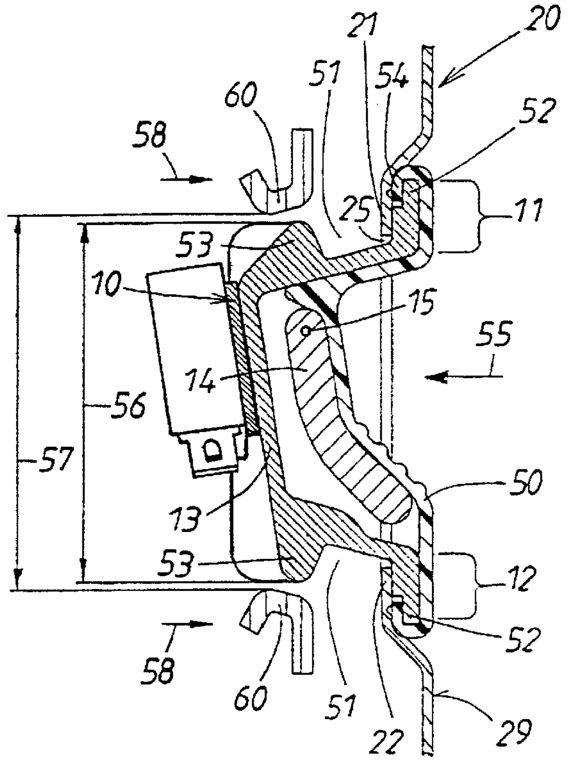
FIGS. 3–5 show the successive phases of the fastening of a door handle in an opening in an exterior door panel with the use of a device according to the invention.
Figure 4:
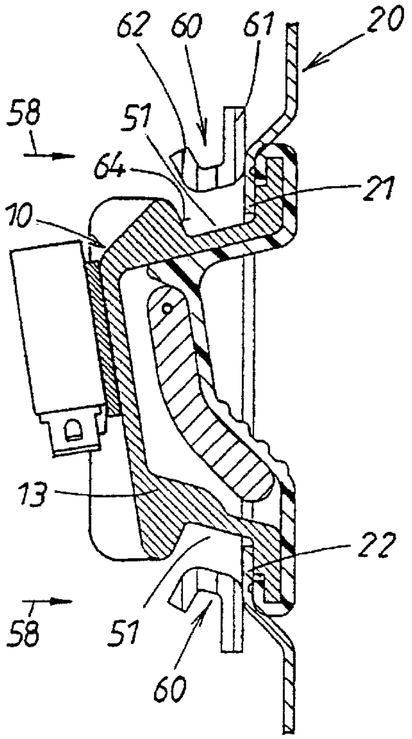
Figure 5:
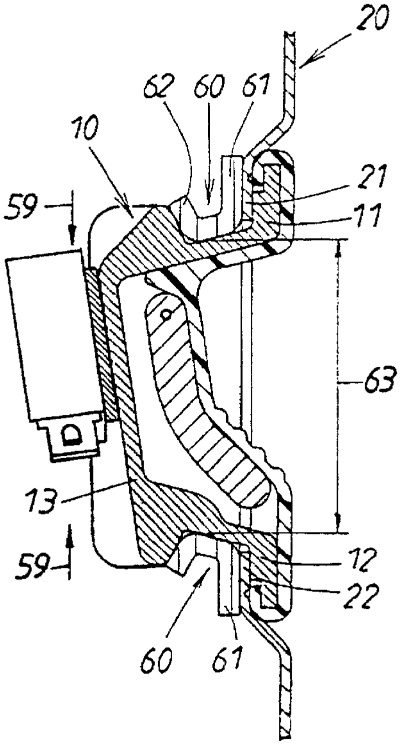
Figure 6:
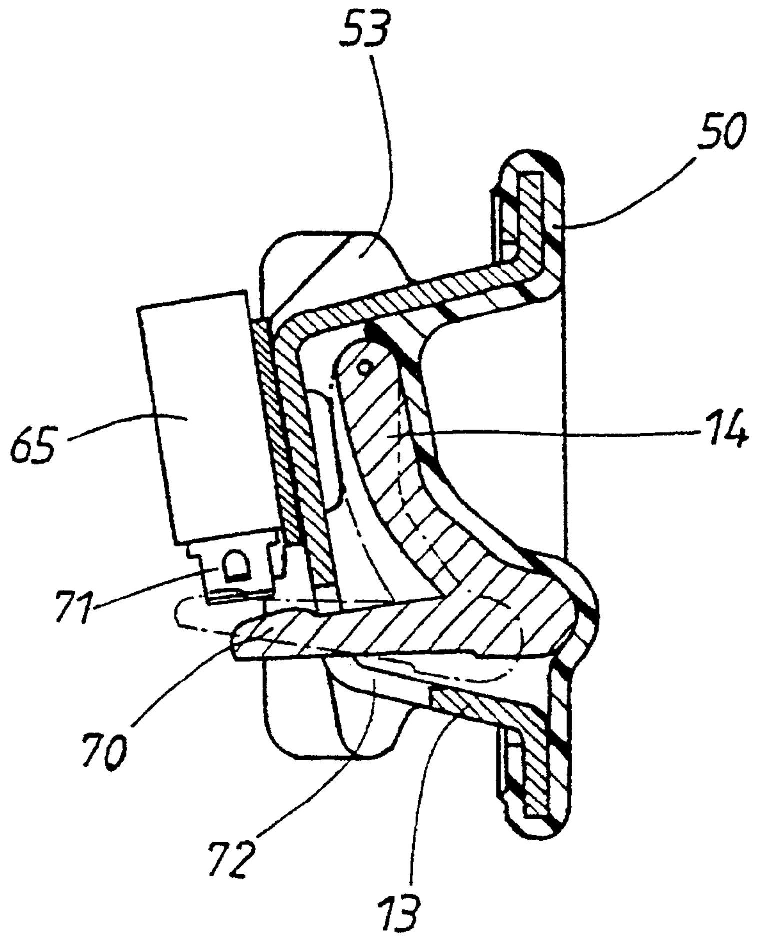
FIG. 6 shows a cross section through the device according to the invention at the level of the switch.

The insert 10 comprises a preassembled unit, which, as shown in FIGS. 3–6, has a shell-like housing 13, in which a push-flap 14 is supported with freedom to rotate around an axis 15, which extends in, for example, the horizontal direction. The fastened state is shown in FIGS. 5 and 7. The push-flap 14 is held by a restoring spring, not shown, in a defined home position against rotational stops and can be moved against this restoring force. As a result, as is especially clear in FIGS. 1 and 6, a switching lever 70, which is formed on the back of the push-flap 14 and passes through an opening 72 in the shell-like housing 13, is pressed against a contact 71 of a switch 65, mounted on the outside surface of the housing 13. FIG. 6 shows the inactive position of the switching lever 70 in solid line, whereas the broken line shows the switching lever 70 in the active position, that is, the position in which it touches the contact 71. The switch 65 moves the lock on the door (not shown) to one of the desired "working positions" by mechanical or electrical means.

A difference of minor importance consists in that a membrane 50 of elastomeric material forms part of the assembly of the insert 10; this membrane closes off the opening of the shell of the housing 13 and rests against the push button 14 on the visible side. The housing 13 of the insert 10 is provided on its external surface with opposite lateral recesses 51, which allow edge flanges 52 to be created toward the visible side. It is advisable for the edge areas of the membrane 50 to wrap around these edge flanges 52 to produce a seal 54 on the side of the edge flanges 52 facing the recesses 51. This seal is similar in function to the seal 24 of the first exemplary embodiment.

FIGS. 3–5 show cross sections of the three different phases of t he insertion movement of the insert 10 into the opening 25 in the carrier. As can be seen, the carrier opening 25 is bounded by an upper, first edge 21 and by a second, lower edge 22.

As an assembly, the insert 10 comprises the shell-like housing 13, the push button 14, and the membrane 50. Its two edge areas 11, 12 can be of essentially the same design. The introduction of the insert 10 into the carrier opening 25 begins with a setting movement to introduce, one after the other, the similarly designed upper and lower beads 53 on the housing profile 13 through the free space of the carrier opening 25, which is designed to be smaller than the distance between the beads. The n the insertion movement 55 of the insert 10 is continued until the edge zones 11 and 12 at the areas 54 of the edge flanges 52 come to rest against the two edges 21, 22 of the carrier on the visible side 29. The insertion movement itself is now complete, but the fastening has not yet been performed.

The first phase of the fastening operation is illustrated in FIG. 3. Two clamping strips 60, which can have a n outline approximately complementary to the recesses 51, are components of a tensioning device, shown in its entirety in FIG. 2, which executes a two-phase tensioning movement. Initially, the two clamping strips 60 are separated from each other by a lateral distance 57, which is greater than the maximum width 56 of the housing in the area of the beads 53. First, the two clamping strips 60 are subjected to a slip-on movement 58.

The slip-on movement 58 has been completed in FIG. 4. Then the forward sidepieces 61 of the two clamping strips 60 are in contact with the two edges 21, 22 of the carrier. Now the approach movement 59 of the two strips 60 illustrated by the arrow 59 in FIG. 5 takes place. The strips enter the recesses 51 in the housing 13, where the convexly shaped, possibly overdimensioned, clamping strips 60 are firmly held in the concave shape of the recesses 51. It is advisable for the approach movement 59 of the clamping strips 60 to be handled automatically by the above-mentioned tensioning device.

The final fastened state is shown in FIG. 5. The clamping strips 60 are lowered almost completely into the recesses 51 and assume a final position in which they are separated by the distance 63. Whereas the forward sidepieces 61 of the V-shape clamping strip 60 end up essentially parallel to the associated carrier edges 21, 22, their rear sidepieces 62 point backward at an angle. The rear flanks 64 of the recesses 51 in the housing 13 facing the visible side can also be slanted and angle toward the base of the recess 51. After the two clamping strips 60 have been brought together in the direction 59 according to FIG. 5, it is therefore now possible for pressure to be exerted between the housing edge areas 11, 12 and the associated carrier edges 21, 22, respectively, as a result of the difference between the angle of 62 on the one side and that of 64 on the other. Alternatively or additionally, it is also possible for the tensioning device which controls the clamping strips 60 to provide this pressure. In the fastened condition shown in FIG. 5, the clamping strips 60 surround the housing 13 as though encircling its waist, and their forward sidepieces 61 hold the insert 10 reliably on the carrier 20.

The final fastened condition is kept permanent in this example by the connecting means of the assembled clamping strips 60. As can be seen in FIG. 2, angles 69 are formed at the ends of the two clamping strips 60 so that one sidepiece of the angle 69 on the clamping strip 60 is parallel to a sidepiece of the angle 69 on the other clamping strip 60. Each of these parallel sidepieces of the angles has an opening for a connecting means. In FIG. 2, the two clamping strips are joined together at the two ends by means of a bolt 66 and a nut 67. To make it easier to remove the clamping strips 60 from the insert 10, a spring 68 is also provided between the angles 69 of the two clamping strips.

FIG. 1 shows the shell-like housing 13 from the rear. It is evident that the beads 53 do not have to extend over the entire length of the housing 13. In this example, three beads 53 and thus also three recesses 51 are provided along each side of the housing. The arrangement of the beads 53 corresponds to the arrangement of the rear sidepieces 62 of the clamping strips 60. FIG. 2 shows a suitable tensioning device, where three specially designed rear sidepieces 62 are provided on each of the clamping strips 60, these sidepieces being able to fit into the three recesses 51 in the housing shown in FIG. 1. The number of beads 53, recesses 51, and sidepieces 62 is arbitrary.

List of Reference Numbers

10 door handle, insert
11 first, upper edge area of 10
12 second, lower edge area of 10
13 shell-like housing
14 press-flap, push button
15 axis of 14
20 carrier, exterior door panel
21 first, upper edge of the carrier at 25
22 second, lower edge of the carrier at 25
25 opening in 20, carrier opening
29 front side of 22, visible side of carrier 20
50 membrane
51 recesses
52 edge flange on 13
53 lateral bead on 13
54 sealing area of 50
55 insertion movement of 10 in 25
56 housing width at 53
57 original distance between 60
58 slip-on movement of 60
59 arrow of the approach movement of 60
60 clamping strip
61 forward sidepiece of 60
62 rear sidepiece of 60
63 final distance between 60 in the fastened state
64 rear flank of 51
65 switch
66 bolt
67 nut
68 spring
69 angle
70 switching lever
71 contact
72 opening in 13

What is claimed is:

1. Device with an insert (10), which can be fixed in place in an opening (25) of a carrier (20) in motor vehicles, where the opening (25) in the carrier (20) is bounded by a first edge (21) and an opposite, second edge (22); and the insert (10) has first and second edge areas (11, 12), which can be pressed against the first and second edges (21, 22) of the carrier in the fastened state; and a shell-like housing (13) of the insert (10) is provided on its external surface with lateral recesses (51) on opposite sides, which are bounded by edge flanges (52) on the visible side and by beads (53) on the other side;

where, at the beginning of the insertion movement (55) of the insert (10) into the carrier opening (25), the beads (53) can be introduced successively into the free space of the carrier opening (25), which is narrower than the insert; and the two edge areas (11, 12) of the insert (10) are designed as strips, so that they can be pressed against the edges (21, 22) of the carrier during the insertion movement (55) of the insert (10) into the carrier opening (25), wherein after the insertion movement (55), a tensioning device fastens the insert (10) in the carrier opening (25) over the course of a two-part tensioning movement (58, 59), the tensioning device consisting of two clamping strips (60);

where the two clamping strips (60) have a shape that is approximately complementary to the recesses (51) in the housing (13); and to improve the clamping action, the clamping strips (60) are convexly overdimensioned, whereas the recesses (51) are provided with a concave shape.

2. Device according to claim 1, wherein the housing of a door handle forms the insert (10) and this door handle can be fixed in position in an opening of an exterior door panel, which forms the carrier (20).

3. Device according to claim 1, wherein the two-phase tensioning movement (58, 59) consists of a slip-on movement (58) of the tensioning device, followed by an approach movement (59) of the tensioning device toward the housing (13).

4. Device according to claim 1, wherein before, the slip-on movement (58), the two clamping strips (60) are a certain lateral distance apart (57) on the outside surface, where the lateral distance (57) is greater than the maximum housing width (56) in the area of the beads (53); and the clamping strips can be pressed into the recesses (51) in the housing (13) during the approach movement (59).

5. Device according to claim 1, wherein the clamping strips (60) are V-shaped, in that each strip has a forward sidepiece (61), which, after the slip-on movement (58), touches the edge (21, 22) of the carrier, and in that each strip also has a rear sidepiece (62), which is bent at an angle.

6. Device according to claim 1, wherein, after the approach movement (59), the clamping strips (60) are held in the recesses (51).

7. Device according to claim 1, wherein, when in the final fastened state, the clamping strips are a certain final distance (63) from each other, their forward sidepieces (61) being parallel to the edges (21, 22) of the carrier.

8. Device according to claim 1, wherein the rear sidepieces (62) of the clamping strips (60) and the flanks (64) of the recesses (51) facing the visible side (29) of the carrier are slanted.

9. Device according to claim 8, wherein the rear sidepieces (62) and the rear flanks (64) are slanted at different angles so that pressure can be applied.

10. Device according to claim 1, wherein the two clamping strips (60) are connected to each other and when in the fastened state surround the housing (13) as if encircling its waist.

11. Device according to claim 1, wherein the edge areas (11, 12) are of the same design.

12. Device according to claim 1, wherein the insert (10) comprises the housing (13), a push button (14), and a membrane (50) which seals off the shell opening (72) of the housing (13).

13. Device according to claim 12, wherein a switching lever (70) is formed on the push button (14), which lever passes through an opening (72) in the housing (13) and can thus actuate a contact (71) of the switch (65), which is mounted on the outside surface of the housing (13).

14. Device according to claim 13, wherein the edge flange (52) is surrounded by the edge areas of the membrane (50), as a result of which a seal (54) is created.

* * * * *